United States Patent
Ishizaka

(10) Patent No.: US 12,090,931 B2
(45) Date of Patent: Sep. 17, 2024

(54) VEHICLE FLOOR STRUCTURE

(71) Applicant: HONDA MOTOR CO., LTD., Tokyo (JP)

(72) Inventor: Keita Ishizaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 359 days.

(21) Appl. No.: 17/557,113

(22) Filed: Dec. 21, 2021

(65) Prior Publication Data

US 2022/0234523 A1    Jul. 28, 2022

(30) Foreign Application Priority Data

Jan. 25, 2021    (JP) .................................. 2021-009531

(51) Int. Cl.
*B60R 13/08*    (2006.01)
(52) U.S. Cl.
CPC .................................. *B60R 13/083* (2013.01)
(58) Field of Classification Search
CPC .................................................... B60R 13/083
See application file for complete search history.

(56) References Cited

U.S. PATENT DOCUMENTS

| | | | | |
|---|---|---|---|---|
| 6,318,796 B1 * | 11/2001 | Felsen | ..................... | B60H 1/246 296/208 |
| 7,140,070 B2 * | 11/2006 | Yuta | ..................... | B60R 16/0215 248/74.1 |
| 9,669,778 B2 * | 6/2017 | Satou | ................... | B60R 13/0275 |
| 2018/0037084 A1 | 2/2018 | Shibayama et al. | | |

FOREIGN PATENT DOCUMENTS

| | | |
|---|---|---|
| CN | 107685608 | 2/2018 |
| GB | 2271143 | 4/1994 |
| JP | 05-086673 | 11/1993 |
| JP | 06-024212 | 3/1994 |
| JP | 10-100771 | 4/1998 |
| JP | 2001-239899 | 9/2001 |
| JP | 3264583 B2 * | 3/2002 |
| JP | 2006-193112 | 7/2006 |
| JP | 2017-159675 | 9/2017 |
| KR | 10-1998-0055154 | 9/1998 |

OTHER PUBLICATIONS

Japanese Office Action for Japanese Patent Application No. 2021-009531 mailed Feb. 21, 2023.
Chinese Office Action for Chinese Patent Application No. 202111544734.2 mailed Jun. 28, 2023.
Japanese Office Action for Japanese Patent Application No. 2021-009531 mailed Sep. 20, 2022.

* cited by examiner

*Primary Examiner* — Joseph D. Pape
(74) *Attorney, Agent, or Firm* — Amin, Turocy & Watson, LLP

(57) ABSTRACT

In a vehicle floor structure, an insulator is arranged on a floor of a vehicle, and a floor carpet is arranged on the insulator. The vehicle floor structure includes an attachment member that fixes the insulator to a vehicle body side. The attachment member includes a fixation part that fixes the floor carpet.

6 Claims, 7 Drawing Sheets

VEHICLE FLOOR STRUCTURE

CROSS-REFERENCE TO RELATED APPLICATION

Priority is claimed on Japanese Patent Application No. 2021-009531, filed on Jan. 25, 2021, the contents of which are incorporated herein by reference.

BACKGROUND

Field of the Invention

The present invention relates to a vehicle floor structure.

Background

As a vehicle floor structure, a structure is known which is laid in two layers by providing a vibration-damping material sheet (hereinafter, referred to as an insulator) on a floor panel and providing a floor carpet on the insulator. According to the vehicle floor structure, a stay is provided on a convex wall surface part of the floor panel, and an insertion groove is formed between the stay and the convex wall surface part. An edge part of the insulator is inserted in the insertion groove, and thereby, the insulator is held (fixed) in a state of being positioned relative to the floor panel.

A protrusion is formed on a side sill side of the floor panel on an outside in a vehicle width direction, and a hook of the floor carpet is engaged with the protrusion. A side sill scuff is fitted to the hook of the floor carpet, and thereby, the floor carpet is held (fixed) in a state of being positioned relative to the insulator (for example, refer to Japanese Unexamined Utility Model Application, First Publication No. H5-86673).

SUMMARY

In the vehicle floor structure of Japanese Unexamined Utility Model Application, First Publication No. H5-86673, two members such as the stay and the side sill scuff are required in order to lay the insulator and the floor carpet on the floor panel in two layers, respectively. Therefore, the number of members for holding (fixing) is increased, and there is room for improvement from this point of view.

An object of an aspect of the present invention is to provide a vehicle floor structure capable of reducing the number of members required for providing an insulator and a floor carpet in two layers on a floor panel.

A vehicle floor structure according to a first aspect of the present invention is a vehicle floor structure in which an insulator is arranged on a floor of a vehicle and a floor carpet is arranged on the insulator, the structure including: an attachment member that fixes the insulator to a vehicle body side, wherein the attachment member includes a fixation part that fixes the floor carpet.

According to this configuration, the attachment member that fixes the insulator to the vehicle body side is provided, the fixation part is formed on the attachment member, and the floor carpet is fixed by the fixation part. In this way, by forming the fixation part on the attachment member, the insulator and the floor carpet can be fixed in two layers by one attachment member. Thereby, for example, it is possible to reduce the number of members required for providing the insulator and the floor carpet in two layers on the floor panel.

In a vehicle floor structure according to a second aspect, the attachment member may include a harness protection part that protects a wire harness.

According to this configuration, a harness protection part is formed on the attachment member, and the wire harness is protected by the harness protection part. Accordingly, the attachment member also serves as a protection member of the wire harness. Thereby, for example, it is possible to eliminate a dedicated member such as a corrugated tube that is conventionally required for protecting the wire harness.

In a vehicle floor structure according to a third aspect, the attachment member may include a regulation part that regulates a position of the floor carpet.

According to this configuration, the regulation part is formed on the attachment member, and the position of the floor carpet is regulated by the regulation part. Thereby, for example, even when the floor carpet is stepped on by an occupant and is about to be slightly displaced, it is possible to regulate the movement (displacement) of the floor carpet by the regulation part.

According to an aspect of the present invention, the attachment member that fixes the insulator to the vehicle body side is provided, and the floor carpet is fixed by the fixation part of the attachment member. Thereby, it is possible to reduce the number of members required for providing the insulator and the floor carpet in two layers on the floor panel.

DESCRIPTION OF EMBODIMENTS

Figure 1:
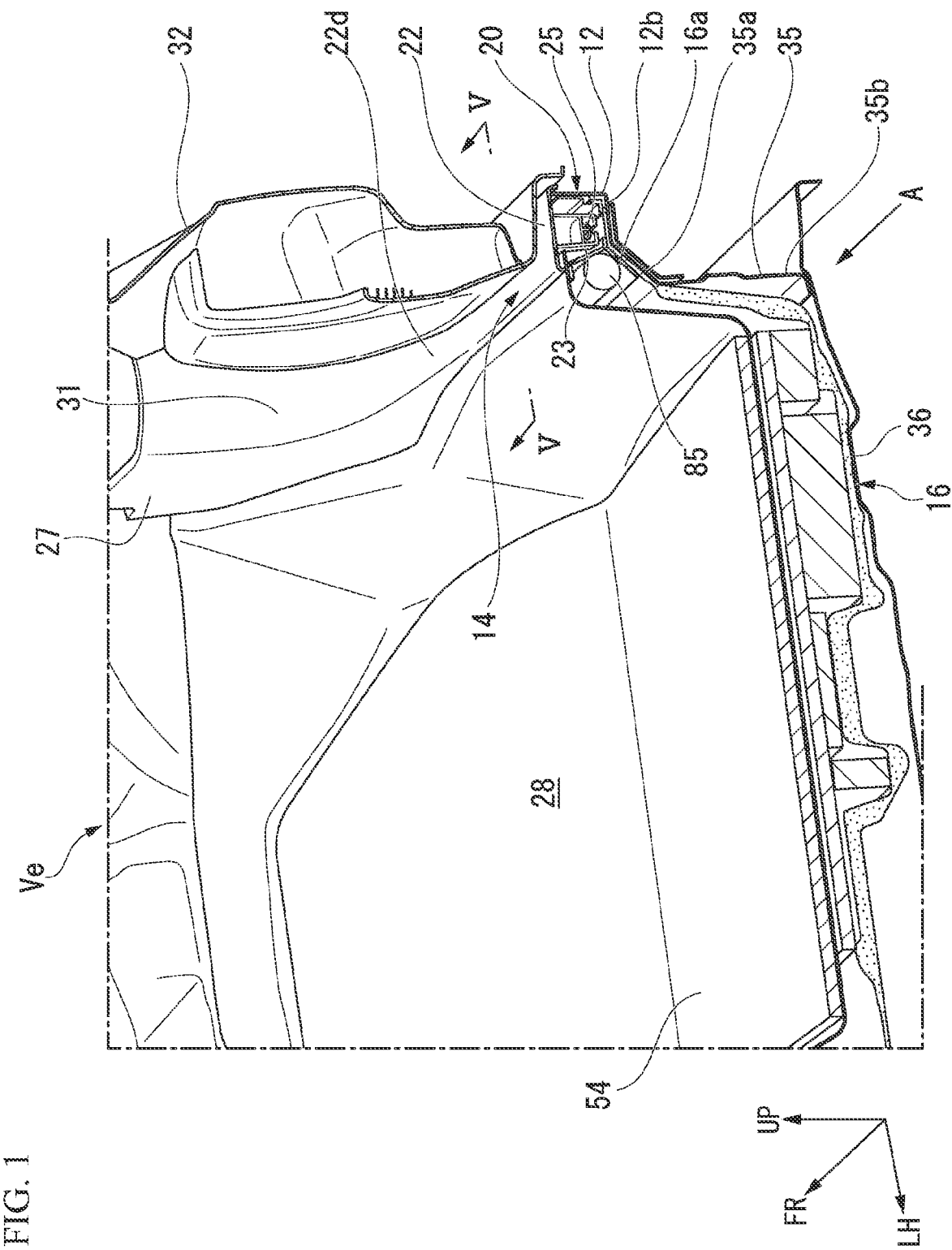
FIG. 1 is a perspective view of a vehicle that includes a vehicle floor structure according to an embodiment of the present invention when seen from a vehicle room side.

Hereinafter, a vehicle floor structure 20 according to an embodiment of the present invention will be described with reference to the drawings. In the drawings, an arrow FR indicates a frontward direction of a vehicle, an arrow UP indicates an upward direction of the vehicle, and an arrow LH indicates a leftward direction of the vehicle. A vehicle Ve and the vehicle floor structure 20 have a substantially symmetrical configuration in a right-to-left direction, and by giving the same reference numeral to right and left components, the right component is described in detail.

<Vehicle Ve>

Figure 2:
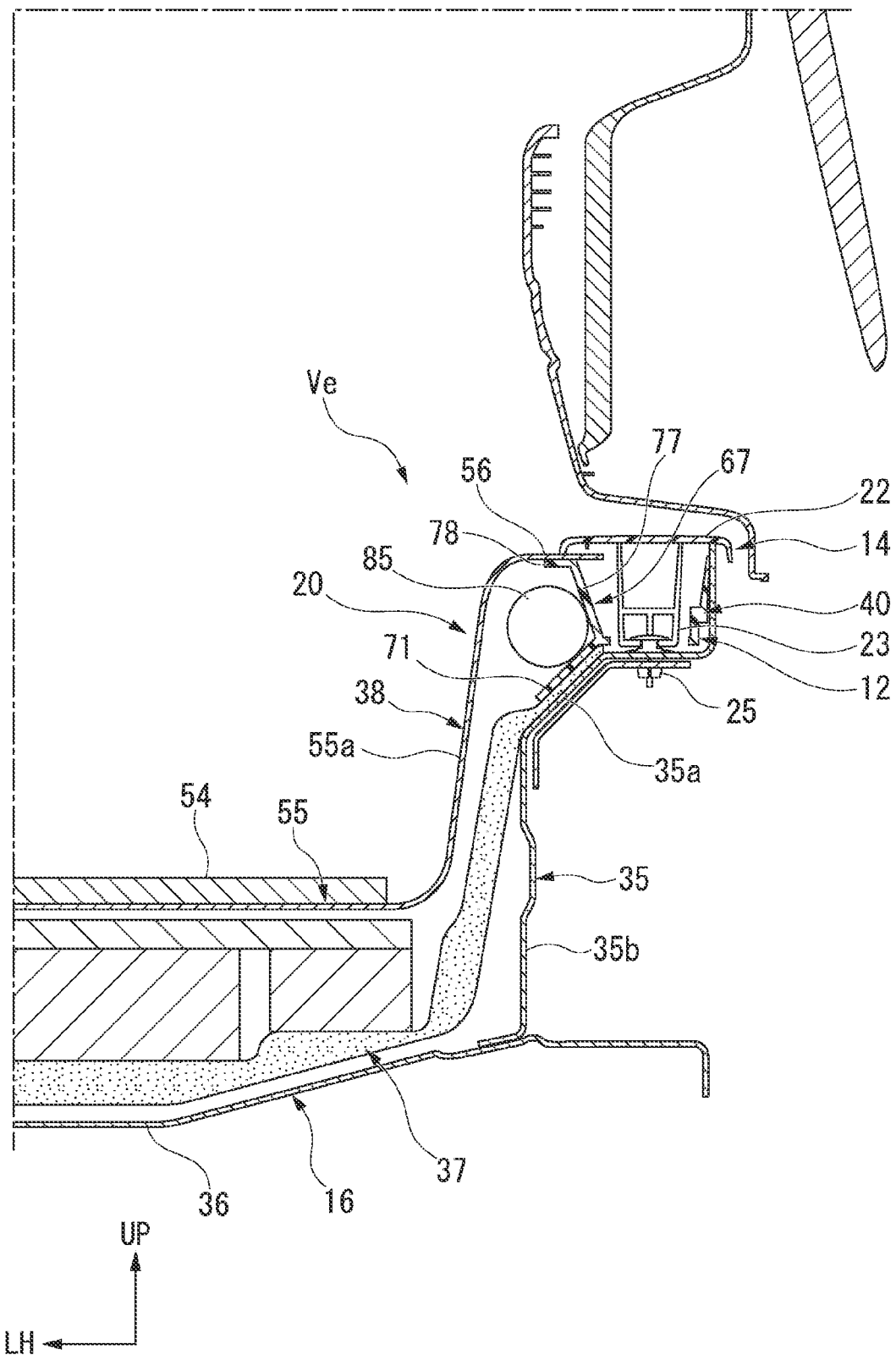
FIG. 2 is a cross-sectional view of the vehicle of FIG. 1 when seen from an arrow A direction.
Figure 3:
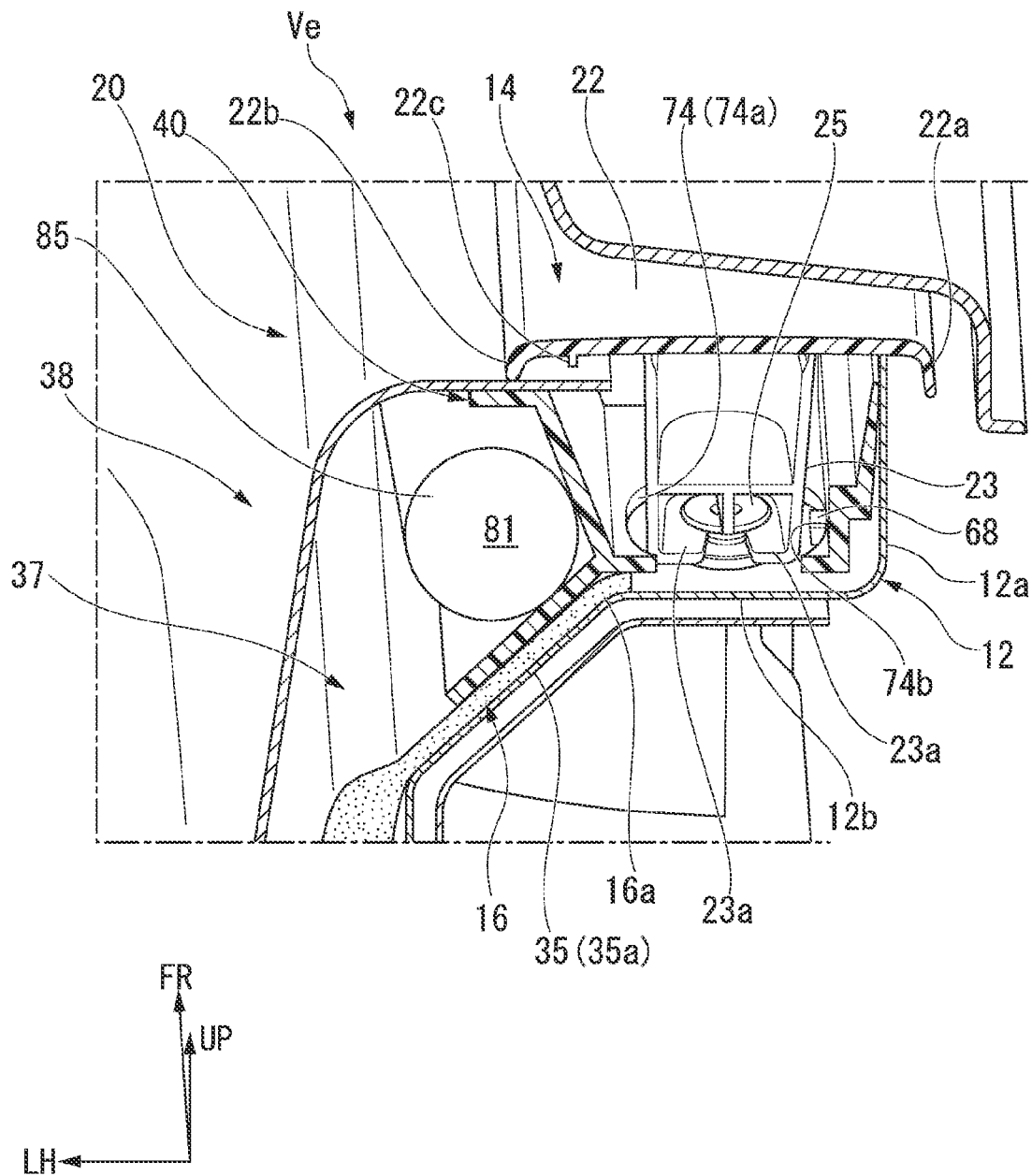
FIG. 3 is a cross-sectional view showing a vehicle floor structure of the embodiment.

FIG. 1 is a perspective view of the vehicle Ve that includes the vehicle floor structure 20 of the embodiment when seen from a vehicle room side. FIG. 2 is a cross-sectional view of the vehicle Ve of FIG. 1 when seen from an arrow A direction. FIG. 3 is a cross-sectional view showing the vehicle floor structure 20 of the embodiment.

As shown in FIG. 1, the vehicle Ve includes, for example, a side sill 12, a step garnish 14, a floor panel 16, and the vehicle floor structure 20.

The side sill 12 is arranged on right and left outer sides in a vehicle width direction and extends in a vehicle body front-to-rear direction. The side sill 12 includes, for example, a side sill sidewall 12a and a side sill bottom part 12b. The side sill 12 is formed, for example, of the side sill sidewall 12a and the side sill bottom part 12b in an L shape in cross section. A step garnish 14 is attached to the side sill 12.

The step garnish 14 includes a step part 22 and a step attachment part 23.

The step part 22 extends in the vehicle body front-to-rear direction along and above the side sill 12 and is arranged horizontally. The step part 22 includes a first protrusion portion 22a, a second protrusion portion 22b, and a rib 22c. The first protrusion portion 22a is a region that forms an outer side of the step part 22 and protrudes downward. The second protrusion portion 22b is a region that forms an inner side of the step part 22 and protrudes downward. The rib 22c is formed along the second protrusion portion 22b at the outside in the vehicle width direction of the second protrusion portion 22b and protrudes downward.

The step attachment part 23 protrudes downward from the step part 22 to the side sill bottom part 12b of the side sill 12. The step attachment part 23 is fixed by a step clip (fastening member) 25 in a state where the side sill bottom part 12b is in contact with a bottom portion 23a from an upward direction. Thereby, the step part 22 is arranged above the side sill 12 and is held in a state of extending in the vehicle body front-to-rear direction along the side sill 12. That is, the side sill 12 is covered by the step part 22 from above.

A front pillar garnish 27 is integrally formed on a front end portion 22d of the step part 22. The front pillar finish 27 is a region that stands from the front end portion 22d of the step part 22 and covers a front pillar (not shown) from a vehicle room 28 side. A side opening part 31 that is formed of a step garnish 14, the front pillar garnish 27, and the like are covered by a front side door 32. An outer side 16a of the floor panel 16 is provided on the side sill bottom part 12b.

The floor panel 16 is, for example, a plate member made of steel that forms a floor part of the vehicle Ve. The floor panel 16 includes a panel sidewall 35 and a panel bottom part 36. The panel sidewall 35 includes an inclination part 35a and a vertical part 35b. The inclination part 35a is inclined inward in the vehicle width direction toward a downward direction from an inner side of the side sill bottom part 12b. The vertical part 35b extends downward from a lower side of the inclination part 35a. A longitudinal wall of a floor (floor part) of the vehicle is formed of the inclination part 35a and the vertical part 35b.

The panel bottom part 36 extends inward in the vehicle width direction from a lower side of the vertical part 35b. A bottom portion of the floor part of the vehicle Ve is formed of the panel bottom part. The vehicle floor structure 20 is laid on the floor part (that is, the floor panel 16) of the vehicle Ve.

<Vehicle Floor Structure 20>

Figure 4:
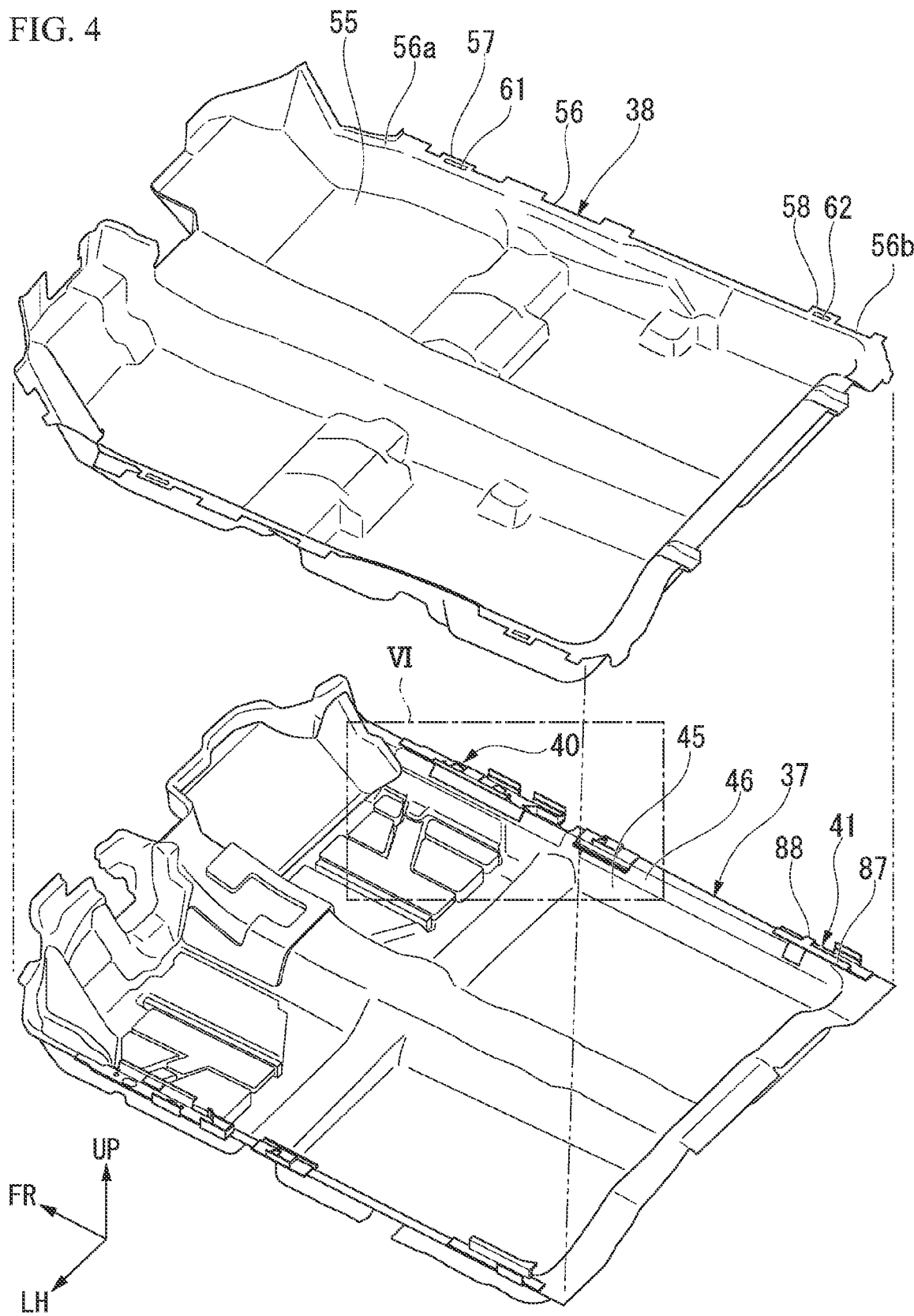
FIG. 4 is an exploded perspective view in which an insulator and a floor carpet of the embodiment are disassembled.
Figure 5:
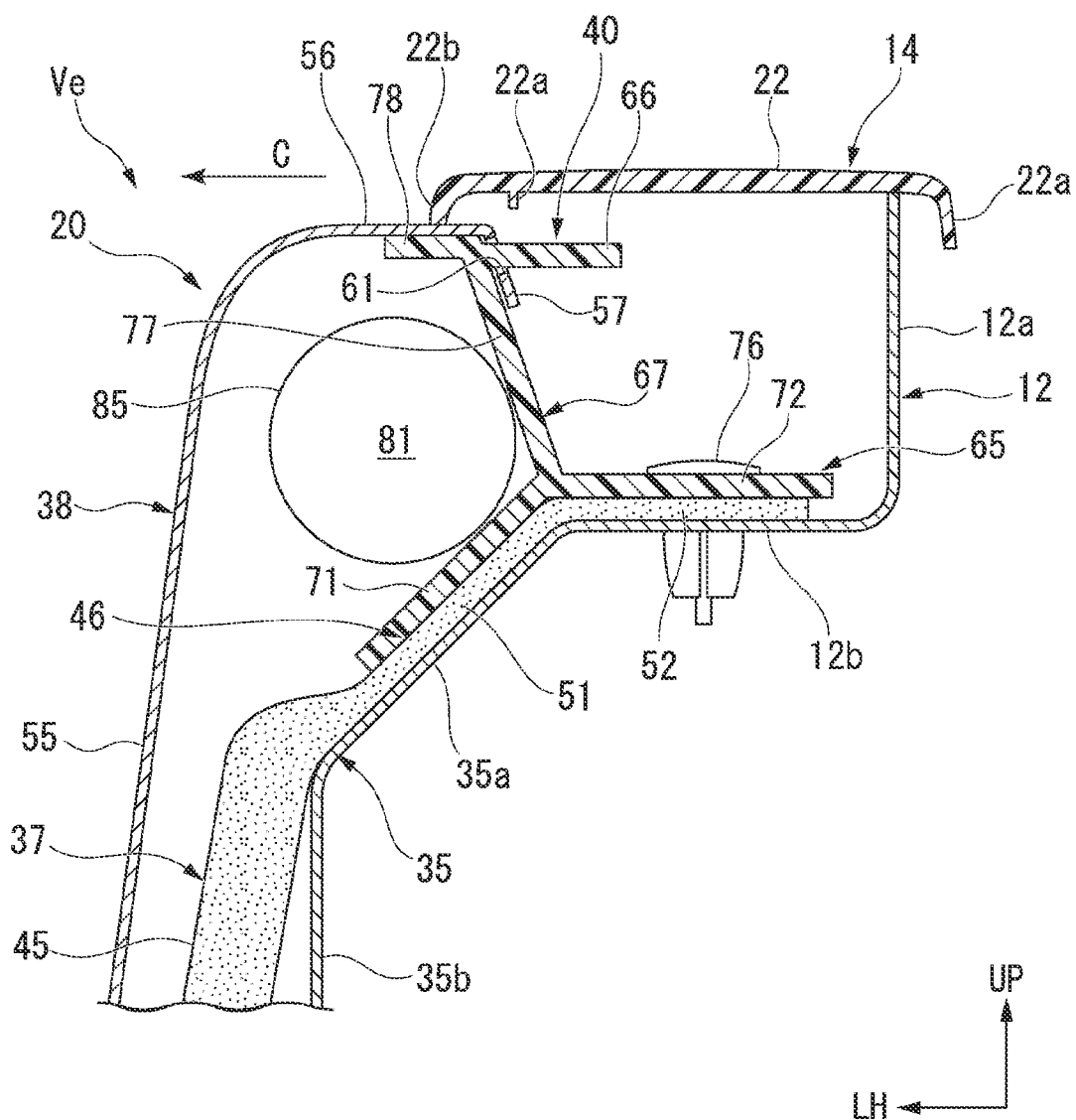
FIG. 5 is a cross-sectional view along a V-V line of FIG. 1.

FIG. 4 is an exploded perspective view in which an insulator 37 and a floor carpet 38 of the embodiment are disassembled. FIG. 5 is a cross-sectional view along a V-V line of FIG. 1.

As shown in FIG. 4 and FIG. 5, the vehicle floor structure 20 includes, for example, the insulator 37, the floor carpet 38, a first attachment member (attachment member) 40, and a second attachment member (attachment member) 41.

(Insulator 37)

The insulator 37 is laid, for example, in a substantially entire region of the floor of the vehicle. Specifically, the insulator 37 is arranged, for example, in a state of being laid along the panel sidewall 35 and the panel bottom part 36 of the floor panel 16 and a floor tunnel (not shown). The insulator 37 is, for example, a vibration-proof and sound-proof shield material formed of a non-woven fabric in which reclaimed wool is compressed in a sheet form.

The insulator 37 includes an insulator attachment part 46 that is integrally formed on an upper side of a longitudinal wall 45 on the outside in the vehicle width direction. The insulator attachment part 46 includes, for example, an attachment inclination portion 51 and an attachment horizontal portion 52.

The attachment inclination portion 51 is inclined, for example, outward in the vehicle width direction toward an upward direction from an upper side of the longitudinal wall 45 on the outside in the vehicle width direction. The attachment inclination portion 51 is arranged, for example, so as to be in contact with an inclination part 35a (that is, a vehicle body side) of the panel sidewall 35.

The attachment horizontal portion 52 extends, for example, outward in the vehicle width direction from an upper side of the attachment inclination portion 51. The attachment horizontal portion 52 is arranged, for example, so as to be in contact with the side sill bottom part 12b (that is, a vehicle body side).

That is, the insulator attachment part 46 is arranged, for example, so as to be in contact with the inclination part 35a and the side sill bottom part 12b and is fixed to the inclination part 35a and the side sill bottom part 12b (that is, the vehicle body side) by the first attachment member 40 and the second attachment member 41 described later.

(Floor Carpet 38)

The floor carpet 38 is laid (arranged) along the insulator 37 on upper and inner surfaces (that is, on the insulator 37) of the insulator 37 in a state where the floor carpet 38 is overlapped on the entire region of the insulator 37. The embodiment is described using an example in which the floor carpet 38 is a carpet which is generally used as a floor carpet of an automotive and in which a shag is provided on a surface skin; however, the floor carpet is not limited thereto. For example, a floor mat 54 (refer to FIG. 1) that is generally used can be laid as the floor carpet.

The floor carpet 38 includes a carpet main body 55, a loop part 56, a first fit part 57 and a second fit part 58.

As shown in FIG. 2 and FIG. 4, the carpet main body 55 is arranged so as to be laid on the panel side wall 35 and the panel bottom part 36 of the floor panel 16 and in a region corresponding to a floor tunnel (not shown) in a state of being overlapped on the insulator 37.

The loop part 56 extends, for example, outward in the vehicle width direction from an upper side of a longitudinal wall 55a on the outside in the vehicle width direction of the carpet main body 55.

The first fit part 57 protrudes outward in the vehicle width direction from an outer side of the loop part 56 in a region close to a front end portion 56a of the loop part 56. The first fit part 57 includes a fit opening portion 61 that penetrates in the vertical direction. The fit opening portion 61 is formed, for example, in a rectangular shape (rectangle) in which a longer direction extends in the vehicle body front-to-rear direction.

The second fit part 58 protrudes outward in the vehicle width direction from an outer side of the loop part 56 in a region close to a rear end portion 56b of the loop part 56. The second fit part 58 includes a fit opening portion 62 that penetrates in the vertical direction. The fit opening portion 62 is formed, for example, in a rectangular shape (rectangle) in which a longer direction extends in the vehicle body front-to-rear direction.

The second fit part 58 is formed substantially similar to the first fit part 57, and detailed description thereof is omitted.

(First Attachment Member 40)

Figure 6:
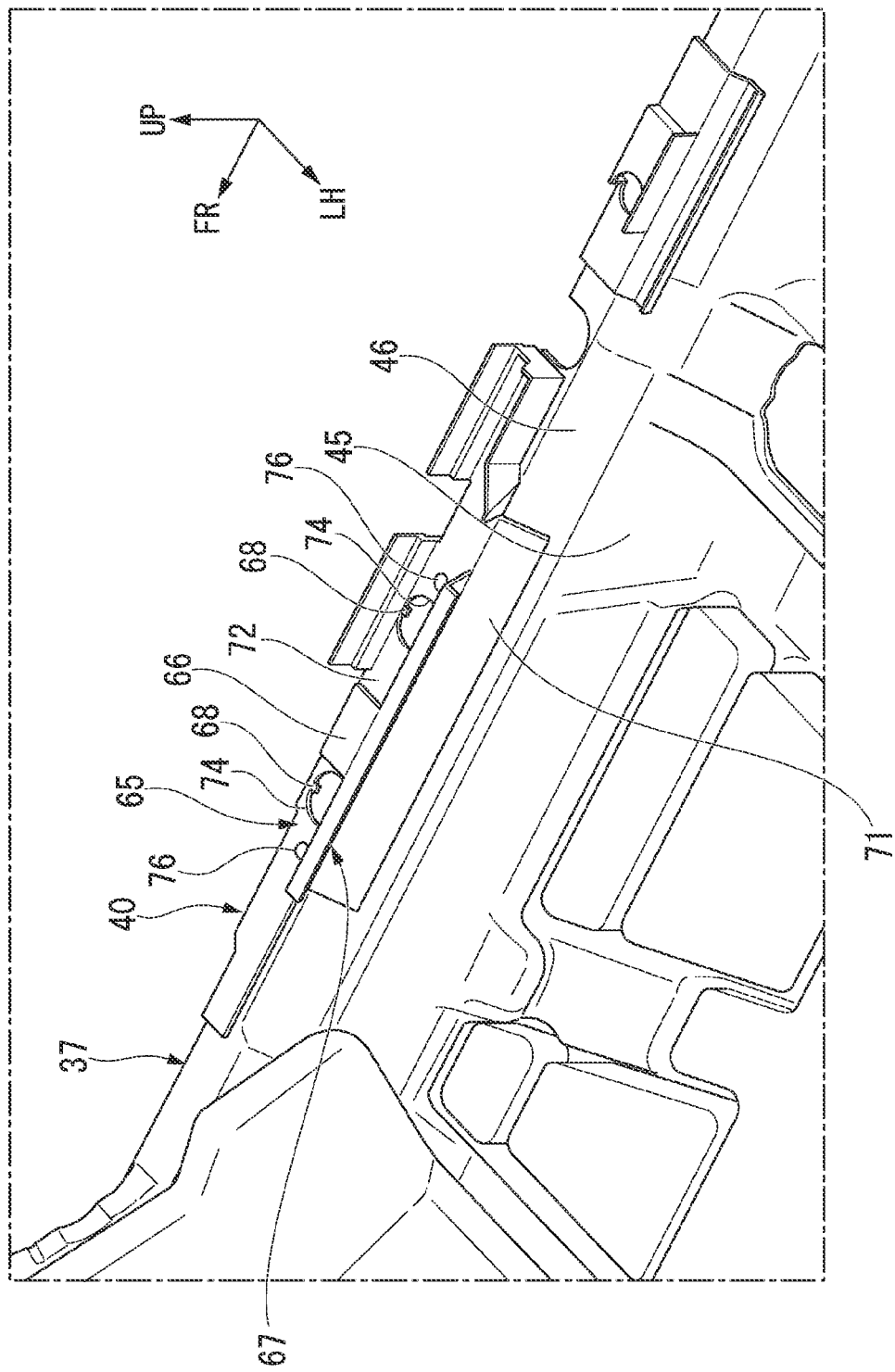
FIG. 6 is an enlarged perspective view of a VI region of FIG. 4.

FIG. 6 is an enlarged perspective view of a VI region of FIG. 4.

As shown in FIG. 3, FIG. 5, and FIG. 6, the first attachment member 40 is formed, for example, by injection molding using a resin material. The first attachment member 40 includes, for example, an attachment base 65, a fixation part 66, a harness protection part 67, and a regulation part 68.

The attachment base 65 is in contact with the insulator attachment part 46 (that is, the attachment inclination portion 51 and the attachment horizontal portion 52) in a state of being pressed against the insulator attachment part 46. The attachment base 65 extends in the vehicle body front-to-rear direction. The attachment base 65 includes a base inclination part 71 and a base flat part 72.

The base inclination part 71 is arranged to be inclined along the attachment inclination portion 51 (that is, the inclination part 35a) and is in contact with the attachment inclination portion 51 in a state of being pressed from a diagonally upward and inward direction in the vehicle width direction against the attachment inclination portion 51. A base flat part 72 extends outward in the vehicle width direction from an upper side of the base inclination part 71.

Accordingly, the base inclination part 71 and the base flat part 72 are formed in a V shape in cross section.

The base flat part 72 is horizontally arranged along the attachment horizontal portion 52 (that is, the side sill bottom part 12b) and is in contact with the attachment horizontal portion 52 in a state of being pressed against the attachment horizontal portion 52 from above. The base flat part 72 is formed such that a pair of opening portions 74 penetrate in the vertical direction to be spaced from each other in the vehicle body front-to-rear direction. The step attachment part 23 penetrates through the pair of opening portions 74 from above, and a bottom portion 23a of the step attachment part 23 is fixed in a state of being in contact with the side sill bottom part 12b by a step clip 25.

The base flat part 72 (that is, the attachment base 65) is fixed to the side sill bottom part 12b, for example, by a pair of base clips 76. The pair of base clips 76 are provided, for example, to be spaced from each other in the vehicle body front-to-rear direction, penetrate through the attachment horizontal portion 52 of the insulator attachment part 46, and are locked to the side sill bottom part 12b.

In this state, the attachment horizontal portion 52 of the insulator attachment part 46 is fixed to the side sill bottom part 12b (vehicle body side) in a state of being sandwiched by the base flat part 72 and the side sill bottom part 12b. The attachment inclination portion 51 of the insulator attachment part 46 is fixed to the inclination part 35a (vehicle body side) in a state of being sandwiched by the base inclination part 71 and the inclination part 35a.

For example, the pair of base clips 76 penetrate through the attachment horizontal portion 52 of the insulator attachment part 46. Accordingly, for example, even when the insulator 37 is stepped on by an occupant and is slightly displaced, it is possible to regulate the movement of the insulator 37 by the base clip 76.

Figure 7:
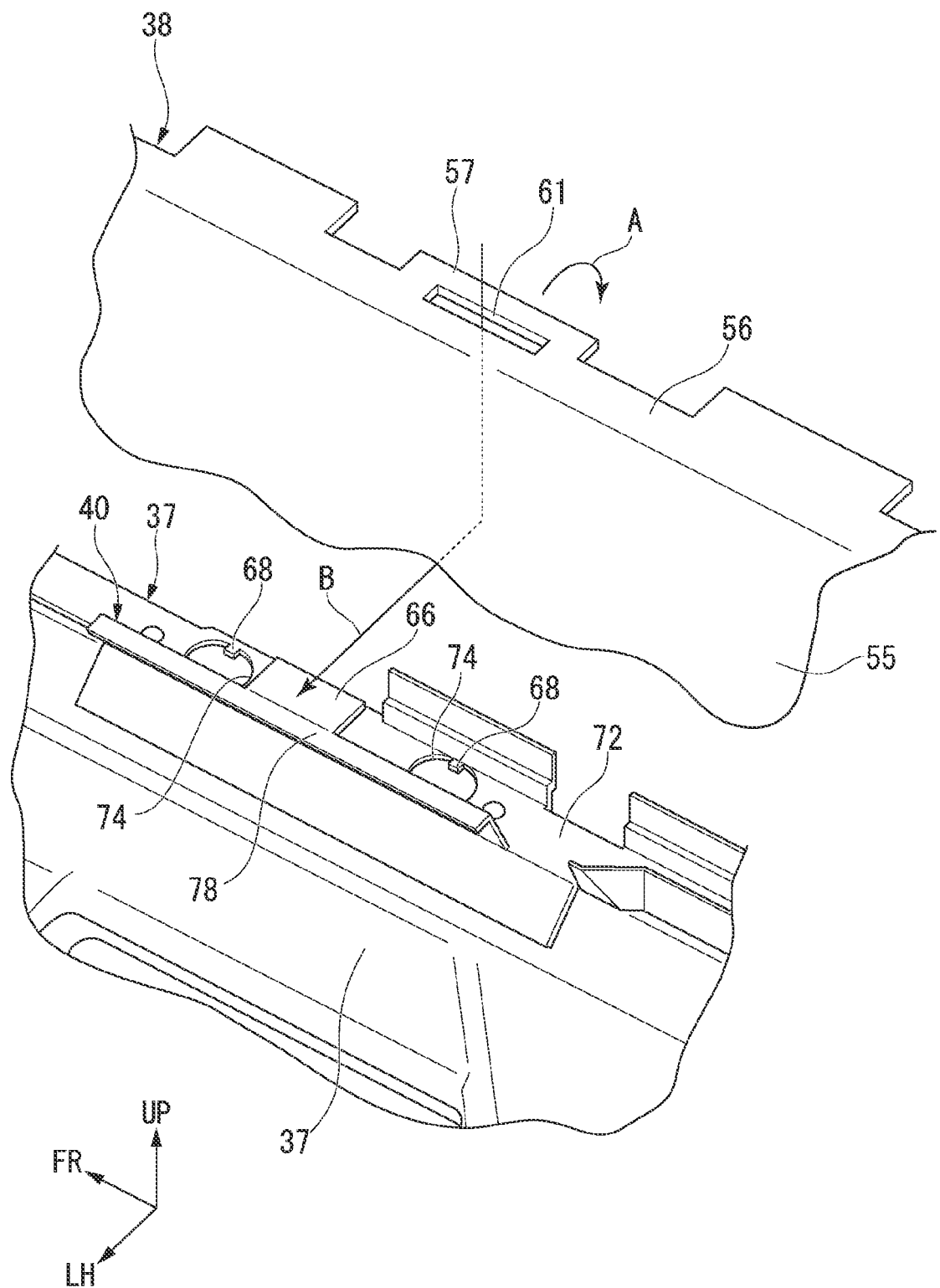
FIG. 7 is a perspective view showing an example in which the floor carpet is fixed to a first attachment member of the embodiment.

FIG. 7 is a perspective view showing an example in which the floor carpet 38 is fixed to the first attachment member 40 of the embodiment.

As shown in FIG. 5 and FIG. 7, the protection inclination part 77 extends so as to be inclined inward in the vehicle width direction toward the upward direction from an upper side of the base inclination part 71 and an inner side of the base flat part 72 (that is, a bend portion of the base flat part 72 and the base inclination part 71). The protection inclination part 77 extends in the vehicle body front-to-rear direction. The fixation part 66 protrudes outward in the vehicle width direction from a substantially middle region of an upper side of the protection inclination part 77. The fixation part 66 is formed, for example, in a rectangular shape (rectangle) in which a longer direction extends in the vehicle body front-to-rear direction.

When the first fit part 57 of the loop part 56 is fixed (locked) to the fixation part 66, for example, the first fit part 57 is bent downward as indicated by an arrow A. The fit opening portion 61 of the first fit part 57 is fitted to the fixation part 66 as indicated by an arrow B in a state where the first fit part 57 is bent.

Accordingly, the first fit part 57 of the loop part 56 is fixed (locked) to the fixation part 66. Thereby, the floor carpet 38 is fixed to the first attachment member 40.

In this state, the loop part 56 of the floor carpet 38 is placed on an eave part 78 of the first attachment member 40. The eave part 78 protrudes inward in the vehicle width direction from an upper side of the protection inclination part 77 and extends in the vehicle body front-to-rear direction. The protection inclination part 77 and the eave part 78 are formed in an L shape in cross section. In a state where the loop part 56 is placed on the eave part 78, for example, the second protrusion portion 22b (specifically, a lower side of the second protrusion portion 22b) of the step garnish 14 is in contact with the loop part 56.

The protection inclination part 77 and the base inclination part 71 are formed in a V shape in cross section. The harness protection part 67 is formed of the protection inclination part 77, the eave part 78, and the base inclination part 71.

The harness protection part 67 is provided on an inner side (that is, the inside in the vehicle width direction) of the base flat part 72 and extends in the vehicle body front-to-rear direction. In a wiring space 81 on the inside in the vehicle width direction of the harness protection part 67, a wire harness 85 is wired in the vehicle body front-to-rear direction along the harness protection part 67. The wire harness 85 is, for example, formed of a plurality of bundled electric wires and is used for an in-vehicle wiring that connects a battery of the vehicle Ve to an electric component or the like.

The wire harness 85 is wired in the wiring space 81, and thereby, an upper side of the wire harness 85, an outside in the vehicle width direction of the wire harness 85, and a lower side of the wire harness 85 are covered by the harness protection part 67. That is, the upper side, the outside in the vehicle width direction, and the lower side of the wire harness 85 are protected by the harness protection part 67. Accordingly, the first attachment member 40 also serves as a protection member of the wire harness 85. Thereby, for example, it is possible to eliminate a dedicated member such as a corrugated tube that is conventionally required for protecting the wire harness 85.

As shown in FIG. 3 and FIG. 6, the regulation part 68 is provided on each of the pair of opening portions 74 of the attachment base 65. The regulation part 68 protrudes inward in the vehicle width direction from an outer region 74b in the vehicle width direction of a circumferential edge 74a of the opening portion 74. The regulation part 68 comes into contact with the step attachment part 23 of the step garnish 14, for example, when first attachment member 40 is about to be slightly displaced inward in the vehicle width direction. Thereby, it is possible to regulate the movement to the inside in the vehicle width direction of the first attachment member 40 by the regulation part 68.

(Second Attachment Member 41)

As shown in FIG. 4, the second attachment member 41 is constituted substantially similar to the first attachment member 40 and includes an attachment base 87, a fixation part 88, and the like. The attachment base 87 is fixed to the side sill bottom part 12b, for example, by a pair of base clips (not shown) similarly to the first attachment member 40. Similarly to the first attachment member 40, the second fit part 58 (specifically, the fit opening portion 62) of the loop part 56 is fitted to the fixation part 88, and the second fit part 58 of the loop part 56 is fixed (locked) to the fixation part 88.

The second attachment member 41 has a configuration similar to the first attachment member 40. Hereinafter, the first attachment member 40 is described, and description of the second attachment member 41 is omitted.

As described above, according to the vehicle floor structure 20 of the embodiment, as shown in FIG. 5 and FIG. 7, the first attachment member 40 that fixes the insulator 37 to the vehicle body side (specifically, the side sill 12) is provided, and the fixation part 66 is formed on the first attachment member 40. Accordingly, the fit opening portion 61 of the first fit part 57 is fitted to the fixation part 66 of the first attachment member 40 as indicated by the arrow A, and thereby, the loop part 56 of the floor carpet 38 is fixed by the fixation part 66.

In this way, by forming the fixation part 66 on the first attachment member 40, it is possible to fix the insulator 37 and the floor carpet 38 to the vehicle body side by one first attachment member 40 in a state where the insulator 37 and the floor carpet 38 are laid in two layers. Thereby, for example, it is possible to reduce the number of members required for laying the insulator 37 and the floor carpet 38 in two layers on the floor panel 16.

As shown in FIG. 3 and FIG. 5, the regulation part 68 is formed on the first attachment member 40. Accordingly, for example, when the first attachment member 40 is about to be slightly displaced inward in the vehicle width direction, it is possible to cause the regulation part 68 to come into contact with the step attachment part 23 of the step garnish 14. Thereby, the movement to the inside in the vehicle width direction of the first attachment member 40 can be regulated by the regulation part 68. The loop part 56 of the floor carpet 38 is fixed to the fixation part 66 of the first attachment member 40.

Accordingly, it is possible to regulate the position of the floor carpet 38 by the regulation part 68. Thereby, for example, even when the floor carpet 38 is stepped on by an occupant and is about to be slightly displaced in an arrow C direction, it is possible to cause the regulation part 68 to come into contact with the step attachment part 23 and regulate the movement (displacement) in the arrow C direction of the floor carpet 38 by the regulation part 68.

The technical scope of the present invention is not limited to the embodiment described above, and various modifications can be added without departing from the scope of the present invention.

For example, the above embodiment is described using an example in which the first attachment member 40 and the second attachment member 41 are provided as the attachment member; however, the embodiment is not limited thereto. As another example, for example, the number of attachment members may be arbitrarily selected.

Further, the above embodiment is described using an example in which one fixation part 66 and one fixation part 88 are formed on the first attachment member 40 and the second attachment member 41, respectively; however, the embodiment is not limited thereto. As another example, for example, the number of fixation parts formed on the first attachment member 40 and the second attachment member 41 may arbitrarily selected.

A component in the embodiment can be replaced by a known component without departing from the scope of the present invention, and the modified examples may be suitably combined.

What is claimed is:

1. A vehicle floor structure in which an insulator is arranged on a floor of a vehicle and a floor carpet is arranged on the insulator, the structure comprising:
   an attachment member that fixes the insulator to a vehicle body side,
   wherein the attachment member includes:
      an attachment base that fixes the insulator from an upper surface and includes a base flat part extending in a vehicle width direction;
      a protection inclination part that stands upward from an inner side in the vehicle width direction of the base flat part; and
      a fixation part that protrudes outward in the vehicle width direction from an upper side of the protection inclination part and fixes the floor carpet.

2. The vehicle floor structure according to claim 1, wherein the base flat part is fixed to a side sill bottom part of a side sill extending in a vehicle front-to-rear direction, the side sill bottom part being located at a vehicle lower position relative to the insulator, by a base clip from a vehicle upward direction.

3. The vehicle floor structure according to claim 1, wherein a step garnish is provided at a vehicle higher position than at least the base flat part, the protection inclination part, and the fixation part.

4. The vehicle floor structure according to claim 3, wherein the step garnish includes a step part and a step attachment part that protrudes downward from the step part to a side sill bottom part of a side sill, and
the step attachment part is fixed by a step clip in a state where the side sill bottom part is in contact with a bottom portion of the step attachment part from an upward direction.

5. The vehicle floor structure according to claim 4, wherein the base flat part includes an opening portion through which the step clip is inserted, and
a regulation part that protrudes inward in the vehicle width direction from an outer region in the vehicle width direction of a circumferential edge of the opening portion is provided.

6. The vehicle floor structure according to claim 1, wherein the attachment member includes:
   the protection inclination part;
   an eave part that protrudes inward in the vehicle width direction from an upper side of the protection inclination part and extends in a vehicle body front-to-rear direction;
   a base inclination part that extends inward in the vehicle width direction and toward a vehicle downward direction from an inner side in the vehicle width direction of the base flat part; and a harness protection part that protects a wire harness, and the harness protection part is constituted of the protection inclination part, the eave part, and the base inclination part.

* * * * *